United States Patent [19]

Hara et al.

[11] Patent Number: 5,123,054
[45] Date of Patent: Jun. 16, 1992

[54] ABNORMAL PATTERN DETECTING APPARATUS

[75] Inventors: Shoji Hara; Nobuyoshi Nakajima, both of Kanagawa, Japan

[73] Assignee: Fuji Photo Film Co., Ltd., Kanagawa, Japan

[21] Appl. No.: 599,928

[22] Filed: Oct. 19, 1990

[30] Foreign Application Priority Data

Oct. 19, 1989 [JP] Japan .................................. 1-272211
Feb. 14, 1990 [JP] Japan .................................. 2-32767

[51] Int. Cl.$^5$ ........................ G06K 9/00; G01N 23/00
[52] U.S. Cl. ................................ 382/6; 364/413.13
[58] Field of Search ................. 364/413.13, 413.23, 364/413.22; 382/6; 250/327.2; 378/901; 358/111

[56] References Cited

U.S. PATENT DOCUMENTS

| | | | |
|---|---|---|---|
| 4,217,641 | 8/1980 | Naparstek | 382/6 |
| 4,644,582 | 2/1987 | Morishita et al. | 382/6 |
| 4,839,807 | 6/1989 | Doi et al. | 382/6 |
| 4,907,156 | 3/1990 | Doi et al. | 382/6 |

Primary Examiner—Leo H. Boudreau
Attorney, Agent, or Firm—Sughrue, Mion, Zinn Macpeak & Seas

[57] ABSTRACT

An abnormal pattern detecting apparatus comprises an image operating device which generates a soft tissue image signal representing a soft tissue image, a bone image signal representing a bone image, and an original image signal representing an original image from several image signals representing radiation images of an object, which radiation images have been recorded by exposing the object to at least two kinds of radiation having different energy distributions. A prospective abnormal pattern finding device finds prospective abnormal patterns, which appear in the soft tissue, bone, and original images, by processing the corresponding image signals with an abnormal pattern finding filter. A bone pattern finding device finds information about the positions of bone patterns appearing in the radiation image. From information about the positions of the prospective abnormal patterns and the information about the positions of the bone patterns, a judgment device judges whether the prospective abnormal patterns thus found are or are not true abnormal patterns.

15 Claims, 8 Drawing Sheets

F I G. 4A
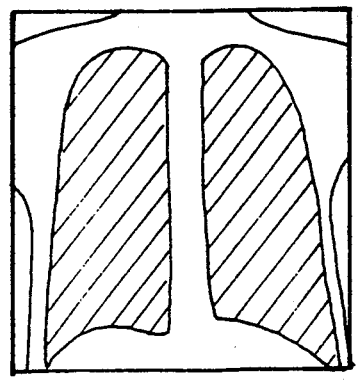
F I G. 4B
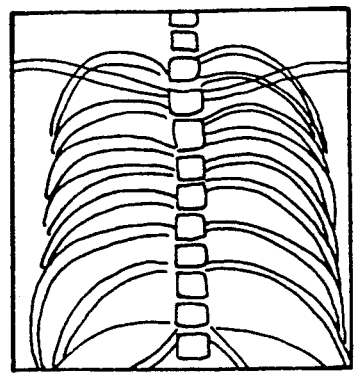
F I G. 4C
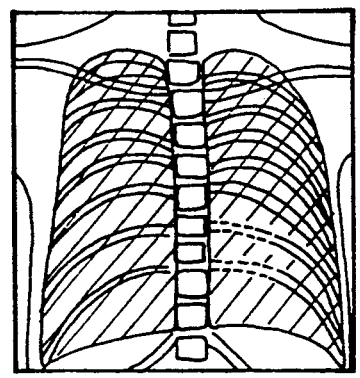

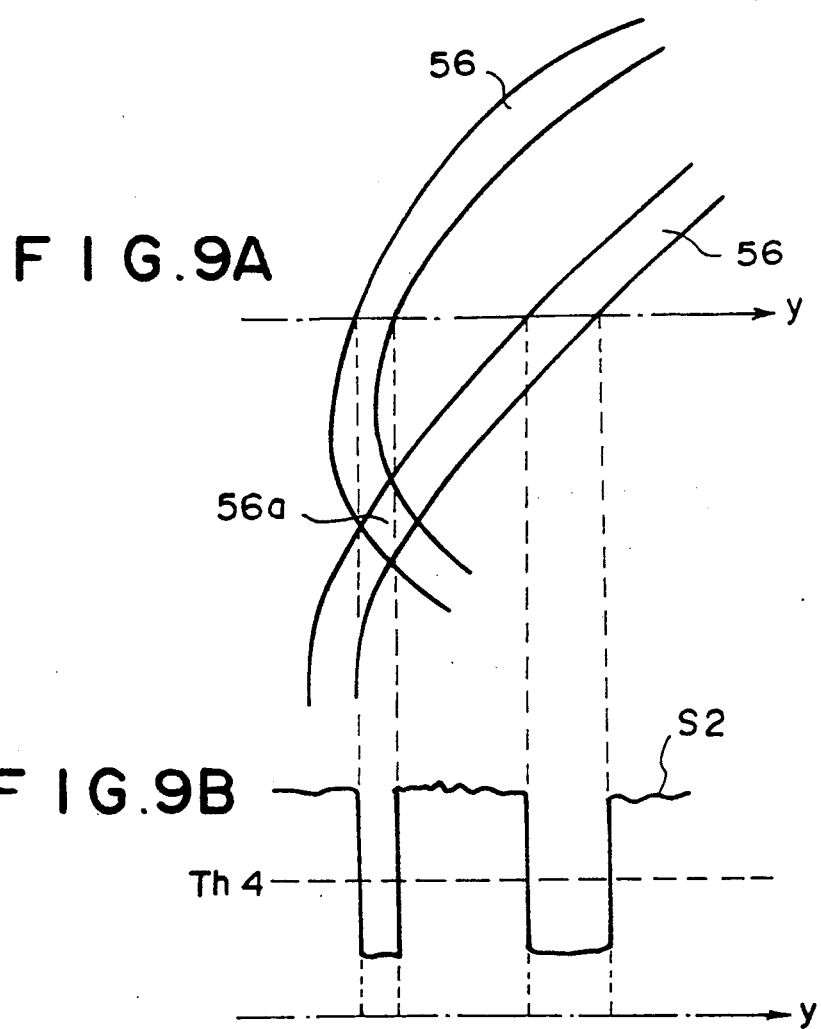

F I G. 11
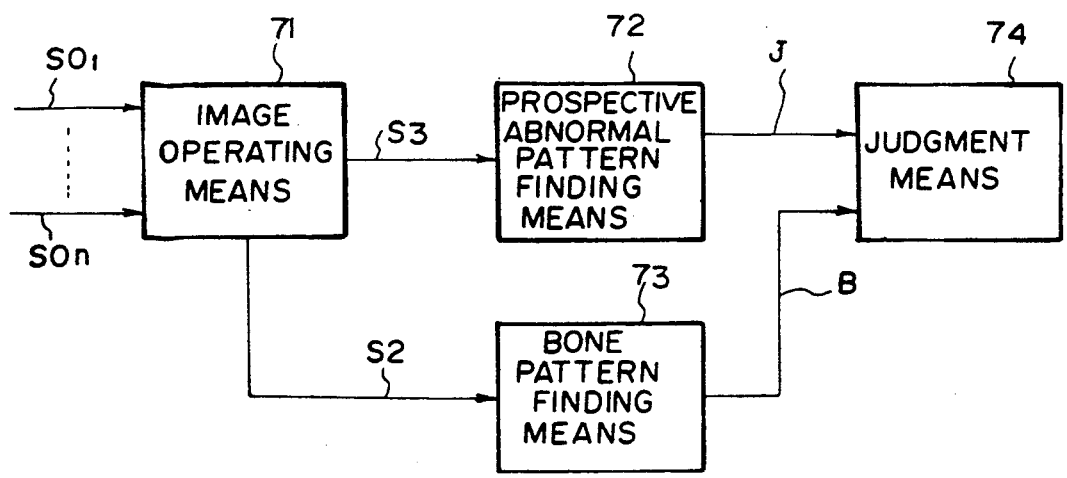

ABNORMAL PATTERN DETECTING APPARATUS

BACKGROUND OF THE INVENTION

1. Field of the Invention

This invention relates to an abnormal pattern detecting apparatus wherein an abnormal pattern in a radiation image of an object is detected from an image signal made up of a series of image signal components representing the radiation image.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT.

Recently, in the radiation image recording and reproducing systems which use X-ray film or stimulable phosphor sheets, particularly in such radiation image recording and reproducing systems designed to facilitate medical diagnoses, not only have image signals been processed in ways which ensure that the visible images produced from them will be of high quality, but image signals have also been processed in ways which allow certain image patterns to be extracted from radiation images. One type of processing which results in extraction of an image pattern is disclosed in, for example, U.S. Pat. No. 4,769,850.

Specifically, an image pattern can be detected in a complicated radiation image by processing the image signal representing it in various ways. The image signal is made up of a series of image signal components, and with appropriate processing the image signal components corresponding to a particular image pattern can be found. For example, from a very complicated radiation image, such as an X-ray image of the chest of a human body, which includes various linear and circular patterns, a pattern corresponding to a tumor, or the like, can be detected.

After a pattern, for example, a tumor pattern, is detected in a complicated radiation image, such as an X-ray image of the chest of a human body, a visible image is reproduced and displayed such that the detected pattern can be viewed clearly. Such a visible image can serve as an effective tool in, particularly, the efficient and accurate diagnosis of an illness.

By way of example, an X-ray image of the chest of a human body, which has been recorded during an ordinary image recording operation, includes both the patterns of soft tissues, such as the heart, the diaphragm, and the lung fields, and the patterns of bones, e.g. the ribs. In cases where operations for automatically finding an abnormal pattern, e.g. a tumor pattern, are carried out on such an ordinary X-ray image of the chest, it may occur that an image pattern, which is not a tumor pattern, is found as a tumor pattern by mistake due to adverse effects of bone patterns. In order that such an error may be avoided, an attempt has been made to obtain an image of only the soft tissues from energy subtraction processing and to find a tumor pattern from the image. Such a technique is described, for example, in "Detection of Chest X-ray Image Pattern Using Energy Subtraction Image" by Katsumi Mizutani, Jun Hasegawa, Junichiro Toriwaki, and Hiroshi Nishiya, Denki Kankei Gakkai, Tokai Branch Joint Meeting, 1987, page 564.

In energy subtraction processing, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

In cases where operations for automatically finding an abnormal pattern, e.g. a tumor pattern, are carried out on a radiation image primarily composed of patterns of soft tissues of an object (hereinafter referred to as the "soft tissue image"), instead of a radiation image composed of both the patterns of soft tissues and the patterns of bones of the object (hereinafter referred to as the "original image"), errors in finding an abnormal pattern, which are caused to occur by adverse effects of the bone patterns, can be reduced. However, the soft tissue image is obtained by processing a plurality of radiation images, and therefore the image quality of the soft tissue image is worse than the original image. Therefore, the problems occur in that errors in finding an abnormal pattern increase due to bad image quality of the soft tissue image.

SUMMARY OF THE INVENTION

The primary object of the present invention is to provide an abnormal pattern detecting apparatus wherein the accuracy, with which an abnormal pattern is detected automatically, is kept high.

FIG. 1 is a block diagram showing the configuration of a first abnormal pattern detecting apparatus in accordance with the present invention.

With reference to FIG. 1, a plurality of image signals SO1, SO2, ..., SOn are fed from, for example, a radiation image read-out apparatus or a radiation image signal storage device, into an image operating means 1. The plurality of the image signals SO1, SO2, ..., SOn represent radiation images of an object, which were recorded during an image recording operation wherein the object constituted of soft tissues and bones was exposed to at least two kinds of radiation having different energy distributions. The image operating means 1 carries out operations on the plurality of the image signals SO1, SO2, ..., SOn in order to generate a soft tissue image signal S1, which represents a soft tissue image primarily composed of patterns of soft tissues of the object, a bone image signal S2, which represents a bone image primarily composed of patterns of bones of the object, and an original image signal S3, which represents an original image composed of both the patterns of soft tissues and the patterns of bones of the object.

The image signals S1, S2, and S3 thus generated are fed from the image operating means 1 into a prospective abnormal pattern finding means 2. Also, an image signal, from which information about the positions of the bone patterns in the radiation image can be found, e.g. the bone image signal S2, is fed from the image operating means 1 into a bone pattern finding means 3.

The prospective abnormal pattern finding means 2 processes the soft tissue image signal S1, the bone image signal S2, and the original image signal S3 with an abnormal pattern finding filter. In this manner, the prospective abnormal pattern finding means 2 finds abnormal patterns which appear in the soft tissue image, the bone image, and the original image. (Specifically, the prospective abnormal pattern finding means 2 finds the presence or absence of abnormal patterns in these images, and finds information about the positions of the abnormal patterns when they have been found as being present in these images.) No limitation is imposed on the abnormal pattern finding filter. By way of example, one of various filters which will be described later, or a combination of two or more of the filters may be employed. Alternatively, any of known filters may be employed.

The term "abnormal pattern" as used herein for the first abnormal pattern detecting apparatus in accordance with the present invention means a pattern, which does not occur in standard patterns, for example, a pattern corresponding to a tumor, a calcified part, a fattened and thickened pleura, or a pneumothorax in an X-ray image of the chest. The prospective abnormal pattern finding means 2 need not necessarily find all types of abnormal patterns, but may find only the patterns of, for example, tumors as the abnormal patterns. In this embodiment, judgments are made by a judgment means 4, which will be described later, as to whether the abnormal patterns found in the manner described above are or are not true abnormal patterns. Therefore, the abnormal patterns, which are found by the prospective abnormal pattern finding means 2, are referred to as the prospective abnormal patterns.

As described above, an image signal, from which information about the positions of the bone patterns in the radiation image can be found, e.g. the bone image signal S2, is fed from the image operating means 1 into the bone pattern finding means 3. From the received image signal, the bone pattern finding means 3 finds information B about the positions of the bone patterns in the radiation image, for example, the bone image. No limitation is imposed on how the information B about the positions of the bone patterns in the radiation image. Usually, the bone image is composed only of the bone patterns. Therefore, in cases where the bone image signal S2 is used during the detection of the information B about the positions of the bone patterns, the information B about the positions of the bone patterns in the bone image may be found by processing the bone image signal S2 with a threshold value.

Information J1, J2, and J3 about the positions of the prospective abnormal patterns in the soft tissue image, the bone image, and the original image are generated by the prospective abnormal pattern finding means 2. The information J1, J2, and J3 are fed from the prospective abnormal pattern finding means 2 into the judgment means 4. Also, the information B about the positions of the bone patterns in the radiation image, is fed from the bone pattern finding means 3 into the judgment means 4. From the information J1, J2, J3, and B, the judgment means 4 judges whether the prospective abnormal patterns, which have been found by the prospective abnormal pattern finding means 2, are or are not true abnormal patterns. No limitation is imposed on how the judgments are made. Algorithms used during the judgments may be selected arbitrarily in accordance with the characteristics of the object, the image quality and other characteristics of the soft tissue image, the bone image, and the original image, and whether a prospective abnormal pattern is or is not to be found as an abnormal pattern when the prospective abnormal pattern has which level of the probability of being a true abnormal pattern.

With the first abnormal pattern detecting apparatus in accordance with the present invention, the image signals S1, S2, and S3, which represent the soft tissue image, the bone image, and the original image, are obtained from the plurality of the image signals SO1, SO2, and SO3 representing a plurality of X-ray images of an object which were recorded with radiation having different energy distributions. Prospective abnormal patterns appearing in the soft tissue image, the bone image, and the original image, are then found. Also, from one of the image signals, information about the positions of bone patterns is found. Thereafter, from the information about the positions of the prospective abnormal patterns and the information about the positions of bone patterns, judgments are made as to whether the prospective abnormal patterns thus found are or are not true abnormal patterns. Therefore, an abnormal pattern can be detected more accurately than with a conventional abnormal pattern detecting apparatus wherein an abnormal pattern is detected from the original image or from the soft tissue image.

FIG. 11 is a block diagram showing the configuration of a second abnormal pattern detecting apparatus in accordance with the present invention.

With reference to FIG. 11, a plurality of image signals SO1, SO2, ..., SOn are fed from, for example, a radiation image read-out apparatus or a radiation image signal storage device, into an image operating means 71. The plurality of the image signals SO1, SO2, ..., SOn represent radiation images of an object, which were recorded during an image recording operation wherein the object constituted of soft tissues and bones was exposed to at least two kinds of radiation having different energy distributions. The image operating means 71 carries out operations on the plurality of the image signals SO1, SO2, ..., SOn in order to generate a bone image signal S2, which represents a bone image primarily composed of patterns of bones of the object, and an original image signal S3, which represents an original image composed of both the patterns of soft tissues and the patterns of bones of the object.

The original image signal S3 thus generated is fed from the image operating means 71 into a prospective abnormal pattern finding means 72. Also, the bone image signal S2 is fed from the image operating means 1 into a bone pattern finding means 73.

The prospective abnormal pattern finding means 2 processes the original image signal S3 with an abnormal pattern finding filter. In this manner, the prospective abnormal pattern finding means 72 finds abnormal patterns which appear in the original image. (Specifically, the prospective abnormal pattern finding means 72 finds the presence or absence of abnormal patterns in the original image, and finds information about the positions of the abnormal patterns when they have been found as being present in the original image.) No limitation is imposed on the abnormal pattern finding filter. By way of example, one of various filters which will be described later, or a combination of two or more of the filters may be employed. Alternatively, any of known filters may be employed.

The term "abnormal pattern" as used herein for the second abnormal pattern detecting apparatus in accordance with the present invention means a pattern, which does not occur in standard patterns, for example, a pattern corresponding to a tumor, a calcified part, a fattened and thickened pleura, or a pneumothorax in an X-ray image of the chest. The prospective abnormal pattern finding means 72 need not necessarily find all types of abnormal patterns, but may find only the patterns of, for example, tumors as the abnormal patterns. In this embodiment, judgments are made by a judgment means 74, which will be described later, as to whether the abnormal patterns found in the manner described above are or are not true abnormal patterns. Therefore, the abnormal patterns, which are found by the prospective abnormal pattern finding means 72, are referred to as the prospective abnormal patterns.

As described above, the bone image signal S2 is fed from the image operating means 71 into the bone pattern finding means 73. From the received bone image signal S2, the bone pattern finding means 73 finds information B about the positions of the bone patterns in the bone image. No limitation is imposed on how the information B about the positions of the bone patterns in the radiation image. Usually, the bone image is composed only of the bone patterns. Therefore, the information B about the positions of the bone patterns in the bone image may be found by processing the bone image signal S2 with a threshold value.

Information J about the positions of the prospective abnormal patterns, which have been found by the prospective abnormal pattern finding means 72, in the original image are fed into the judgment means 74. Also, the information B about the positions of the bone patterns in the bone image, is fed from the bone pattern finding means 73 into the judgment means 74. From the information J and B, the judgment means 74 judges whether the prospective abnormal patterns, which have been found by the prospective abnormal pattern finding means 72, are or are not true abnormal patterns. No limitation is imposed on how the judgments are made. Algorithms used during the judgments may be selected arbitrarily in accordance with the characteristics of the object, the accuracy with which the bone patterns are found, the image quality and other characteristics of the original image, and whether a prospective abnormal pattern is or is not to be found as an abnormal pattern when the prospective abnormal pattern has which level of the probability of being a true abnormal pattern.

With the second abnormal pattern detecting apparatus in accordance with the present invention, the image signals S2 and S3, which represent the bone image and the original image, are obtained from the plurality of the image signals SO1, SO2, and SO3 representing a plurality of X-ray images of an object which were recorded with radiation having different energy distributions. Prospective abnormal patterns appearing in the original image, are then found. Also, information about the positions of bone patterns is found from the bone image signal S2. Thereafter, from the information about the positions of the prospective abnormal patterns and the information about the positions of bone patterns, judgments are made as to whether the prospective abnormal patterns thus found are or are not true abnormal patterns. Therefore, an abnormal pattern can be detected more accurately than with a conventional abnormal pattern detecting apparatus wherein an abnormal pattern is detected from the original image or from the soft tissue image.

BRIEF DESCRIPTION OF THE DRAWINGS

FIGS. 4A, 4B, and 4C are schematic view showing examples of a soft tissue image, a bone image, and an original image, FIG. 9A is an enlarged view showing part of the bone image shown in FIG. 4B, FIG. 9B is a graph showing the bone image signal S2 which corresponds to the part of the bone image shown in FIG. 9A, FIG. 11 is a block diagram showing the second abnormal pattern detecting apparatus in accordance with the present invention.

DESCRIPTION OF THE PREFERRED EMBODIMENTS

The present invention will hereinbelow be described in further detail with reference to the accompanying drawings.

First, an embodiment of the first abnormal pattern detecting apparatus in accordance with the present invention will be described below. In this embodiment, X-ray images are stored on stimulable phosphor sheets, and a pattern of a tumor, which typically has an approximately spherical shape in the lungs of a human body, is detected as an abnormal pattern from the X-ray images. In a visible image reproduced from an image signal representing the X-ray image, the tumor pattern typically appears as an approximately circular pattern having a lower density than the areas of the image surrounding the tumor pattern.

Figure 2:
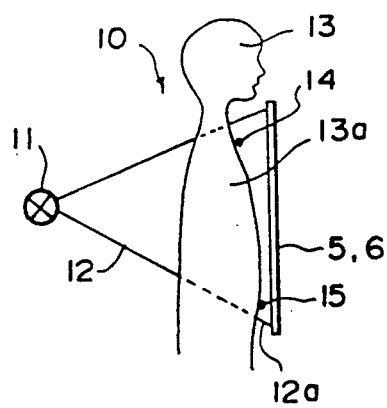
FIG. 2 is a schematic view showing an example of an X-ray image recording apparatus.

FIG. 2 is a schematic view showing an example of an X-ray image recording apparatus.

With reference to FIG. 2, X-rays 12 are produced by an X-ray source 11 of an X-ray image recording apparatus 10 and irradiated to the chest 13a of a human body 13. X-rays 12a, which have passed through the human body 13, impinge upon a first stimulable phosphor sheet 5. In this manner, a first X-ray image of the chest 13a of the human body 13 is stored on the first stimulable phosphor sheet 5.

Thereafter, the first stimulable phosphor sheet 5 is quickly removed from the X-ray image recording apparatus 10, and a second stimulable phosphor sheet 6 is quickly set therein. Also, the tube voltage of the X-ray source 11 is changed. The X-ray image recording operation is then carried out for the second stimulable phosphor sheet 6. In this manner, a second X-ray image of the same object 13 is stored on the second stimulable phosphor sheet 6 with X-rays, which have a different energy distribution than the X-rays used during the recording of the first X-ray image on the first stimulable phosphor sheet 5. The object 13 is provided with marks 14 and 15, and images of the marks 14 and 15 are also recorded on the first stimulable phosphor sheet 5 and the second stimulable phosphor sheet 6. As an aid in facilitating the explanation, the reference numerals 14 and 15 will hereinafter denote both the marks and the images thereof. The marks 14 and 15 are used when the positions of the first X-ray image stored on the first stimulable phosphor sheet 5 and the second X-ray image stored on the second stimulable phosphor sheet 6 are adjusted so that they coincide with each other.

Figure 3:
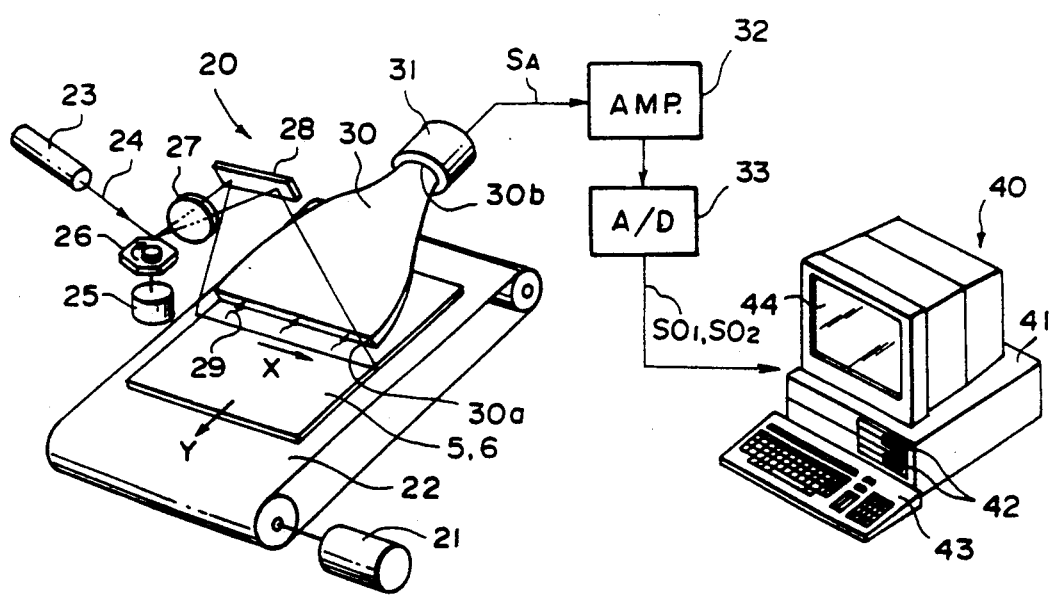
FIG. 3 is a perspective view showing an example of an X-ray image read-out apparatus and a computer system which is provided with an embodiment of the first abnormal pattern detecting apparatus in accordance with the present invention.

FIG. 3 is a perspective view showing an example of an X-ray image read-out apparatus and a computer system which is provided with an embodiment of the first abnormal pattern detecting apparatus in accordance with the present invention.

After the image recording operations are carried out with the X-ray image recording apparatus 10 shown in FIG. 2, the first stimulable phosphor sheet 5 and the second stimulable phosphor sheet 6 are set one after another at a predetermined position in an X-ray image read-out apparatus 20 shown in FIG. 3. How the first X-ray image is read out from the first stimulable phosphor sheet 5 will be described hereinbelow.

The first stimulable phosphor sheet 5, on which the first X-ray image has been stored and which has been placed at the predetermined position in the X-ray image read-out apparatus 20, is conveyed in a sub-scanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an $f\theta$ lens or the like. The direction of the optical path of the laser beam 24 is then changed by a mirror 28, and the laser beam 24 impinges upon the stimulable phosphor sheet 5 and scans it in a main scanning direction indicated by the arrow X, which direction is approximately normal to the sub-scanning direction indicated by the arrow Y. When the stimulable phosphor sheet 5 is exposed to the laser beam 24, the exposed portion of the stimulable phosphor sheet 5 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as an acrylic plate and has a linear light input face 30a, positioned so that it extends along the main scanning line on the stimulable phosphor sheet 5, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal SA generated by the photomultiplier 31 is logarithmically amplified by a logarithmic amplifier 32, and digitized by an A/D converter 33 into an electric image signal SO.

The image signal SO is then fed into a computer system 40. The image signal SO thus obtained represents the first X-ray image, which was stored on the first stimulable phosphor sheet 5. Therefore, the image signal SO thus obtained will hereinbelow be referred to as the first image signal SO1.

The computer system 40 is provided with an embodiment of the first abnormal pattern detecting apparatus in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

Thereafter, in the same manner as that described above, a second image signal SO2 is obtained, which represents the second X-ray image stored on the second stimulable phosphor sheet 6. The second image signal SO2 is fed into the computer system 40.

From the first image signal SO1 and the second image signal SO2 which have been fed into the computer system 40, an abnormal pattern in the X-ray image is detected. The computer system 40 carries out the operations corresponding to the blocks 1 through 4 shown in FIG. 1. The blocks 1 through 4 shown in FIG. 1 will hereinafter be referred to as the blocks representing the functions of the computer system 40.

Figure 1:
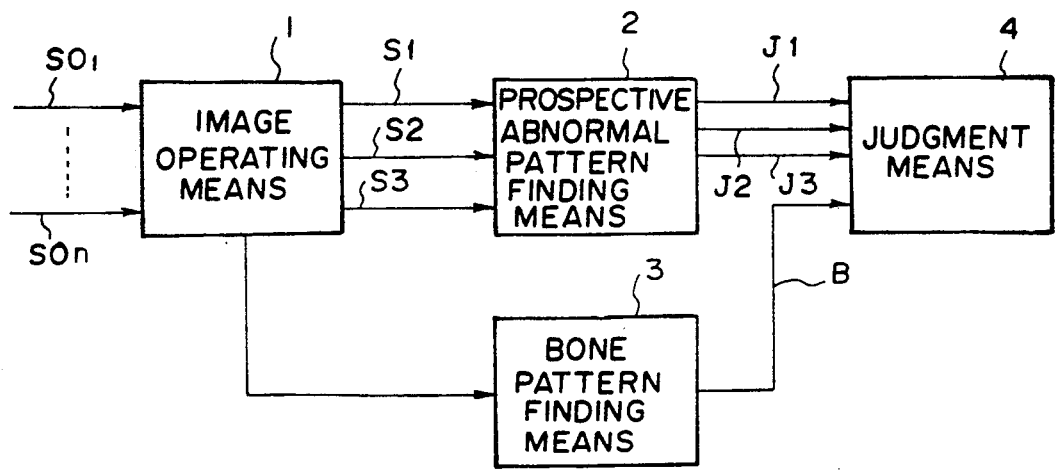
FIG. 1 is a block diagram showing the first abnormal pattern detecting apparatus in accordance with the present invention.

The image signals SO1 and SO2, which are digital electric signals representing the first and second X-ray images, are fed into the image operating means 1 of the computer system 40, which image operating means 1 is shown in FIG. 1.

Image Operating Means

As described above, the first image signal SO1 and the second image signal SO2 represent the first and second X-ray images, which were recorded with the X-rays having different energy distributions. The X-rays having different energy distributions exhibit different transmittances with respect to soft tissues and bones of the object (the chest of a human body in this case). Therefore, by carrying out the subtraction processing on the first and second X-ray images, an image of only the soft tissues of the object (i.e. a soft tissue image) and an image of only the bones of the object (i.e. a bone image) can be obtained.

From the first image signal SO1 and the second image signal SO2, the image operating means 1 of the computer system 40 adjusts the positions of the first and second X-ray images in the manner described below. In this embodied, the process for adjusting the positions is employed which is disclosed in U.S. Pat. No. 4,710,875.

The marks 14 and 15 in the first X-ray image represented by the first image signal SO1 will hereinbelow be referred to as the marks 14' and 15'. Also, the marks 14 and 15 in the second X-ray image represented by the second image signal SO2 will hereinbelow be referred to as the marks 14" and 15". The marks 14' and 15' respectively have coordinates (XA1,YA1) and coordinates (XA2,YA2). The marks 14" and 15" respectively have coordinates (XB1,YB1) and coordinates (XB2,YB2).

The following formula obtains:

$$\theta = \tan^{-1}\left(\frac{Y_{B2} - Y_{B1}}{X_{B2} - X_{B1}}\right) - \tan^{-1}\left(\frac{Y_{A2} - Y_{A1}}{X_{A2} - X_{A1}}\right) \tag{1}$$

where $\theta$ denotes the angle of rotation between the two X-ray images, i.e. the angle between the line, which connects the coordinates (XA1,YA1) and the coordinates (XA2,YA2), and the line, which connects the coordinates (XB1,YB1) and the coordinates (XB2,YB2). The positions of the two X-ray images can be caused to coincide with each other by rotating the first X-ray image by the angle $\theta$.

A shift $\Delta X1$ along the x direction between the marks 14' and 14" in the two X-ray images and a shift $\Delta Y1$ along the y direction between the marks 14' and 14" in the two X-ray images are expressed as $$\Delta X_1 = X_{B1} - \{\alpha \cdot (X_{A1} - C_X) \cdot \cos\theta - \alpha(Y_{A1} - C_Y) \cdot \sin\theta + C_X\} \tag{2}$$

$$\Delta Y_1 = Y_{B1} - \{\alpha \cdot (X_{A1} - C_X) \cdot \sin\theta + \alpha(Y_{A1} - C_Y) \cdot \cos\theta + C_Y\} \tag{3}$$

Also, a shift $\Delta X2$ along the x direction between the marks 15' and 15" in the two X-ray images and a shift $\Delta Y2$ along the y direction between the marks 15' and 15" in the two X-ray images are expressed as $$\Delta X_2 = X_{B2} - \{\alpha \cdot (X_{A2} - C_X) \cdot \cos\theta - \alpha(Y_{A2} - C_Y) \cdot \sin\theta + C_X\} \tag{4}$$

$$\Delta Y_2 = Y_{B2} - \{\alpha \cdot (X_{A2} - C_X) \cdot \sin\theta + \alpha(Y_{A2} - C_Y) \cdot \cos\theta + C_Y\} \tag{5}$$

In Formulas (2) through (5), CX and CY respectively denote the X and Y coordinates of the center of rotation.

In ideal cases, $\Delta X1$ and $\Delta X2$ will be equal to each other. Also, $\Delta Y1$ and $\Delta Y2$ will be equal to each other. However, in some cases, they will not be equal to each other because of errors in sampling of the image signals SO1 and SO2. Therefore, position adjustment amounts $\Delta X$ and $\Delta Y$ along the X and Y directions are calculated from the formulas $$\Delta X = (\Delta X_1 + \Delta X_2)/2 \tag{6}$$

$$\Delta Y = (\Delta Y_1 + \Delta Y_2)/2 \tag{7}$$

The amounts thus calculated are used during the adjustment of the position of the first X-ray image along the X and Y directions.

In the manner described above, a first image signal SO1' and a second image signal SO2' are obtained, which respectively represent the first and second X-ray images whose positions have been adjusted. Thereafter, in the image operating means 1, the image signal components of the first image signal SO1' and the second image signal SO2' which represent corresponding picture elements in the two X-ray images are subtracted from each other. The subtraction processing is expressed as $$S1 = Wa \cdot SO_1' - Wb \cdot SO_2' + C \qquad (8)$$

where Wa and Wb denote weighting coefficients, and C denotes the bias component. In this manner, a soft tissue image signal S1 is obtained which represents a soft tissue image.

Also, the weighting coefficients and the bias component are changed, and the image signal components of the first image signal SO1' and the second image signal SO2' which represent corresponding picture elements in the two X-ray images are subtracted from each other. The subtraction processing is expressed as $$S2 = Wa' \cdot SO_1' - Wb' \cdot SO_2' + C' \qquad (9)$$

where Wa' and Wb' denote weighting coefficients, and C' denotes the bias component. In this manner, a bone image signal S2 is obtained which represents a bone image.

Each of the first and second X-ray images is composed of the patterns of the soft tissues and bones, though the image densities (the values of the image signal) of the patterns of the soft tissues and bones are different for the first and second X-ray images. Therefore, either one of the first and second X-ray images may be employed as the original image. However, in this embodiment, in order that noise occurring in the X-ray image due to, for example, sway of the X-rays during the image recording operation may be reduced, superposition processing is carried out. Specifically, the image signal components of the first image signal SO1' and the second image signal SO2' which represent corresponding picture elements in the two X-ray images are added together. The superposition processing is expressed as $$S3 = Wa'' \cdot SO_1' + Wb'' \cdot SO_2' \qquad (10)$$

where Wa" and Wb" denote weighting coefficients. The image signal S3 obtained from the superposition processing is employed as the original image signal S3 representing the original image, which is composed of both the soft tissue patterns and the bone patterns. In this embodiment, the image operating means 1 finds the soft tissue image, the bone image, and the original image from the image signals SO1 and SO2 representing the two X-ray images. Alternatively, the image operating means 1 may find the soft tissue image, the bone image, and the original image from a plurality of the image signals SO1, SO2, ... , SOn. (Such a technique is disclosed in U.S. Pat. No. 4,855,598.)

FIGS. 4A, 4B, and 4C show examples of the soft tissue image, the bone image, and the original image.

In the soft tissue image shown in FIG. 4A, the bone patterns have been eliminated from the X-ray image of the object, and only the patterns of the soft tissues are formed. In the bone image shown in FIG. 4B, the soft tissue patterns have been eliminated from the X-ray image of the object, and only the patterns of the bones are formed. Also, in the original image shown in FIG. 4C, both the soft tissue patterns and the bone patterns are formed.

The image signals S1, S2, and S3 generated by the image operating means 1 of the computer system 40 are fed into the prospective abnormal pattern finding means 2 of the computer system 40. Also, in this embodiment, the bone image signal S2 is fed into the bone pattern finding means 3 of the computer system 40.

When necessary, the image operating means 1 carries out other image processing, such as frequency response enhancement processing, smoothing processing, or noise elimination processing on the first image signal SO1 and the second image signal SO2, or on the soft tissue image signal S1, the bone image signal S2, and the original image signal S3.

Prospective Abnormal Pattern Finding Means

The prospective abnormal pattern finding means 2, which is provided in the computer system 40, finds tumor patterns, which appear in the soft tissue image, the bone image, and the original image. For this purpose, the prospective abnormal pattern finding means 2 processes the soft tissue image signal S1, the bone image signal S2, and the original image signal S3, which have been received from the image operating means 1, with a tumor pattern finding filter.

Figure 5:
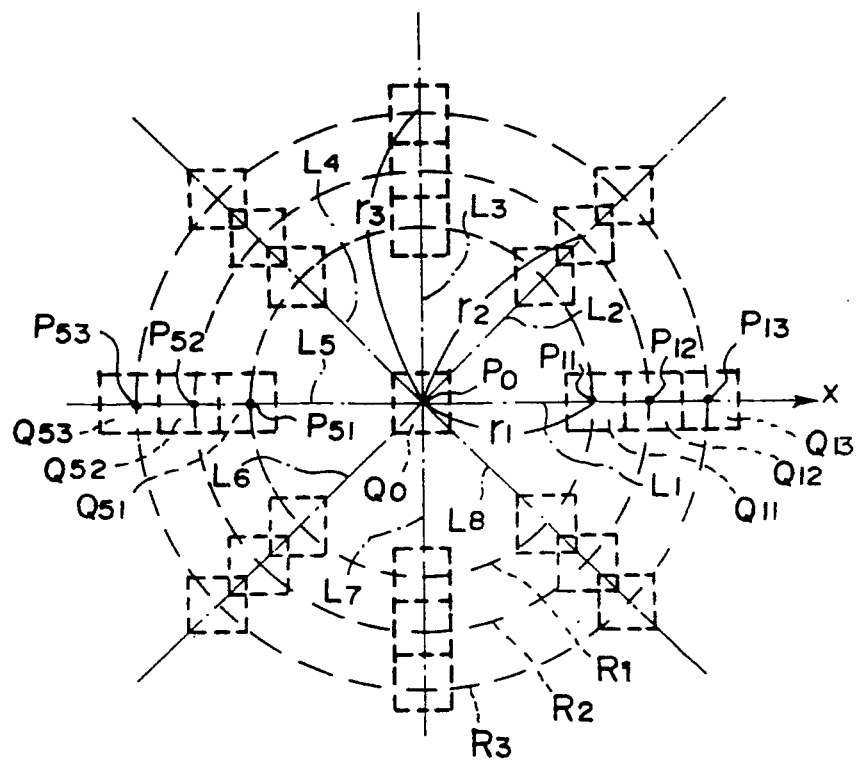
FIG. 5 is a diagram having a predetermined picture element P0 from an X-ray image in the middle, which diagram serves as an aid in explaining how a spatial-domain filter works during the operations for finding a tumor pattern.

FIG. 5 is a diagram having a predetermined picture element P0 from an X-ray image in the middle, which diagram serves as an aid in explaining how a spatial-domain filter works during the operations for finding a tumor pattern. A judgment is made as to whether a predetermined picture element P0 in the X-ray image falls or does not fall within the region corresponding to the tumor pattern in the X-ray image. The tumor patterns, which appear in the soft tissue image, the bone image, and the original image can be detected by processing the image signal components representing the picture elements of the images with the filter illustrated in FIG. 5. How the original image signal S3 is processed with the filter will mainly be described below. The filter described first is disclosed in U.S. Pat. application Ser. No. 542,487.

Figure 6:
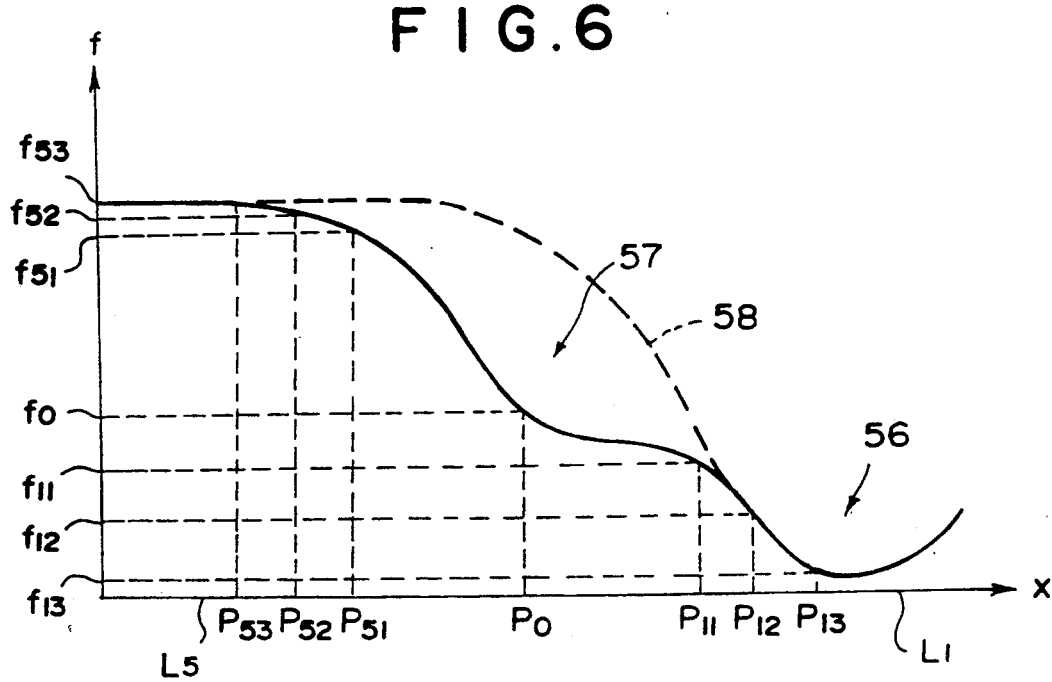
FIG. 6 is a graph showing an example of the profile of an X-ray image around a predetermined picture element P0 in the direction (x direction) along which the lines L1 and L5 shown in FIG. 5 extend.

FIG. 6 is a graph showing an example of the profile of the original image around a predetermined picture element P0 in the direction (x direction) along which the lines L1 and L5 shown in FIG. 5 extend. In this example, the predetermined picture element P0 is located approximately at the middle of a tumor pattern 57, which is close to a rib pattern 56. Typically, the profile of a tumor pattern (i.e. the distribution of the values of the image signal components representing the tumor pattern) is approximately symmetric bilaterally. However, in cases where, for example, the tumor pattern 57 is close to a rib pattern 56 as in the illustrated example, it often occurs that the profile of the tumor pattern 57 is not symmetric bilaterally. It is important that the tumor pattern 57 can be detected even in such cases. In FIG. 6, the broken line 58 represents an example of the profile of the original image including no tumor pattern.

As shown in FIG. 5, a plurality of (in this case, eight) imaginary lines Li, where $i = 1, 2, \ldots, 8$, extend from the predetermined picture element P0 in the X-ray image to peripheral parts of the X-ray image. Also, imaginary circles Rj, where $j = 1, 2, 3$, having radii r1, r2, and r3 extend around the predetermined picture element P0. The image signal component f0 representing the predetermined picture element P0 is found. Also, the image signal components fij, where $i = 1, 2, \ldots, 8$ and $j = 1, 2, 3$, are found which represent the picture elements Pij located at the intersections of each of the lines Li and the circles Rj. (In FIG. 5, P11, P12, and P13 denote picture elements located at the intersections of a line L1 and circles R1, R2, and R3. Also, P51, P52, and P53 denote the picture elements located at the intersections of a line L5 and the circles R1, R2, and R3.)

Thereafter, differences $\Delta ij$ between the value of the image signal component f0 representing the predetermined picture element P0 and the values of the image signal components fij representing the picture elements Pij are calculated from Formula (11), which is expressed as $$\Delta ij = fij - f0 \quad (11)$$
$$(i = 1,2,\ldots,8; j = 1,2,3)$$

For each of the lines Li, the maximum value of the differences $\Delta ij$, which have been calculated from Formula (11), is then found. Specifically, for the line L1, the maximum value of the differences between the value of the image signal component f0 representing the predetermined picture element P0 and the values of the image signal components f11, f12, and f13 representing the picture elements P11, P12, and P13 is found. The differences can be expressed as $$\Delta 11 = f11 - f0$$
$$\Delta 12 = f12 - f0$$
$$\Delta 13 = f13 - f0$$

In this example, as illustrated in FIG. 6, $\Delta 13 < \Delta 12 < \Delta 11 < 0$, and therefore the difference $\Delta 11$ is found to be the maximum value.

For the line L5, the maximum value of the differences between the value of the image signal component f0 representing the predetermined picture element P0 and the values of the image signal components f51, f52, and f53 representing the picture elements P51, P52, and P53 is also found. The differences are expressed as $$\Delta 51 = f51 - f0$$
$$\Delta 52 = f52 - f0$$
$$\Delta 53 = f53 - f0$$

In this example, the difference $\Delta 53$ is found to be the maximum value.

In the manner described above, for each of the lines Li, the differences between the value of the image signal component f0 representing the predetermined picture element P0 and the values of the image signal components fij representing the picture elements Pij are calculated, and the maximum value of the differences is found. Therefore, tumor patterns having various sizes can be detected.

Thereafter, calculations are made to find the mean-level value, for example, the mean value, of two maximum values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by the formula $$M15 = \frac{\Delta 11 + \Delta 53}{2} \quad (12)$$

As described above, two lines extending from the predetermined picture element P0 in opposite directions are grouped into a single set. Therefore, a tumor pattern can be detected accurately even when, as shown in FIG. 6, it is present in the vicinity of, for example, a rib pattern and the distribution of the values of the image signal components representing the tumor pattern is asymmetric.

From the mean values M15, M26, M37, and M48, which have been calculated in the manner described above, a characteristic value C1 is calculated in the manner described below. The characteristic value C1 is used during the judgment as to whether the predetermined picture element P0 falls or does not fall within the region corresponding to the tumor pattern.

Figure 7:
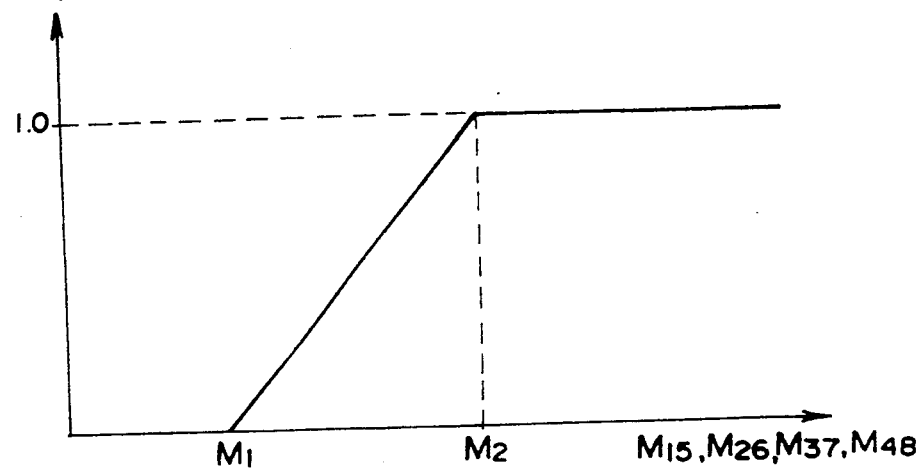
FIG. 7 is a graph showing how a characteristic value is determined which is used during a judgment as to whether a predetermined picture element P0 falls or does not fall within the region corresponding to a tumor pattern.

FIG. 7 is a graph showing how the characteristic value C1 is determined. In FIG. 7, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C1 = C15 + C26 + C37 + C48 \quad (13)$$

is taken as the characteristic value C1. The characteristic value C1 will fall within the range of a minimum value 0.0 to a maximum value 4.0.

The characteristic value C1 is then compared with a predetermined threshold value TH1. From whether $C1 \geq Th1$ or $C1 < TH1$, the judgment is made as to whether the predetermined picture element P0 falls or does not fall within the region corresponding to the tumor pattern.

No limitation is imposed on the algorithms in the filter, which is employed to find the prospective tumor patterns. Another example of the filter will be described hereinbelow. The filter described below is proposed in U.S. Pat. application Ser. No. 542,487.

Specifically, calculations are made to find the gradients $\nabla fij$ of the image signal components fij representing the picture elements Pij, where $i = 1, 2, \ldots, 8$ and $j = 1, 2, 3$, which are shown in FIG. 5.

The term "gradient" as used herein means the vector expressed as $$\nabla f(m,n) = (f(m + 1,n) - f(m,n), f(m,n + 1) - f(m,n)) \quad (14)$$

In Formula (14), (m,n) denotes the x and y coordinates of a certain picture element P in a radiation image, (m+1,n) denotes the coordinates of a picture element P', which is adjacent to the picture element P in the x direction, and (m,n+1) denotes the coordinates of a picture element P'', which is adjacent to the picture element P in the y direction. Also, f(m,n), f(m+1,n), and f(m,n+1) respectively denote the values of the image signal components representing the picture elements P, P', and P''.

Figure 8:
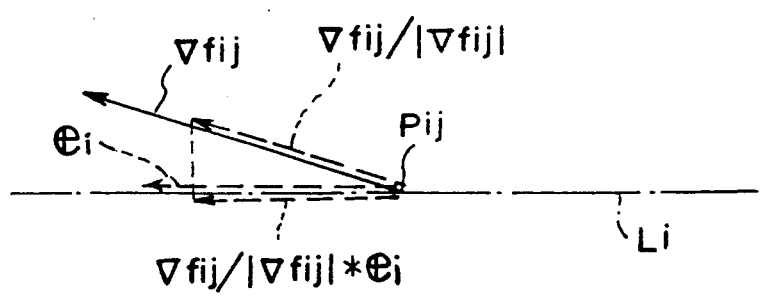
FIG. 8 is an explanatory view showing the vector of a gradient $\nabla fij$ of an image signal component fij.

FIG. 8 shows the gradient of an image signal component fij. How it is calculated is described below.

After the gradients $\nabla fij$ have been calculated, the magnitudes of the gradients $\nabla fij$ are made equal to 1.0. Specifically, the normalized gradients $\nabla fij/|\nabla fij|$ can be calculated by dividing the gradients $\nabla fij$ by their magnitudes $|\nabla fij|$.

Thereafter, the projections of the normalized gradients $\nabla fij/|\nabla fij|$ onto the vectors directed from the picture elements Pij to the predetermined picture element P0 are calculated. The projections are expressed as $\nabla fij/|\nabla fij| * i$, where i denotes the unit vectors directed from the picture elements Pij to the predetermined picture element P0, and * denotes the inner product.

As for the sign of the projections, the direction heading towards the predetermined picture element P0 is taken as positive, and the direction heading away from the predetermined picture element P0 is taken as negative. For each of the lines Li, where i=1, 2, ..., 8, the maximum value of the projections is found. The maximum value is expressed as $$\{\nabla fij/|\nabla fij| * i\}_M$$
$$(i = 1,2,\ldots,8)$$

Thereafter, the sum of the maximum values which were found for each of the respective lines Li is calculated. This sum is expressed as $$\sum_{i=1}^{8} \{\nabla fij/|\nabla fij| * i\}_M$$

The sum expressed as $$\sum_{i=1}^{8} \{\nabla fij/|\nabla fij| * i\}_M$$

is taken as a characteristic value C2. The characteristic value C2 is then compared with a predetermined threshold value Th2. From whether $C2 \leq Th2$ or $C2 < Th2$, a judgment is made as to whether the predetermined picture element P0 falls or does not fall within the region corresponding to the tumor pattern.

With the filter described above, the gradients $\nabla fij$ are normalized, and only the projections thereof (i.e. the extent of differences in the value of the signal components in the directions of the lines Li) onto vectors directed from the picture elements Pij to the predetermined picture element P0 are taken into consideration. Therefore, a characteristic value C2 is obtained, which will be large for a tumor pattern having a circular shape and which does not depend on the contrast of the tumor pattern with respect to the image regions around the tumor pattern. Accordingly, the tumor pattern can be detected accurately.

A further example of the filter utilizing different algorithms will be described hereinbelow. The filter described below is proposed in U.S. Pat. application Ser. No. 542,487.

As shown in FIG. 5, the area of a center region Q0 including the predetermined picture element P0 is selected. Also, the areas of peripheral regions Qij, where i=1, 2, ..., 8 and j=1, 2, 3, are selected for each of the lines Li. Each of the peripheral regions Qij includes one of a plurality of picture elements Pij, where i=1, 2, ..., 8 and j=1, 2, 3. (In FIG. 5, Q11, Q12, Q13, Q51, Q52, and Q53 denote the peripheral regions which respectively include the picture elements P11, P12, P13, P51, P52, and P53.)

Thereafter, a calculation is made to find a mean-level value Q0 of the values of image signal components representing a plurality of picture elements, which are located in the center region Q0. Also, calculations are made to find mean-level values Qij, where i=1, 2, ..., 8 and J=1, 2, 3, each representing the mean level of the values of image signal components representing a plurality of picture elements located in each of the peripheral regions Qij, where i=1, 2, ..., 8 and j=1, 2, 3. As an aid in facilitating the explanation, Q0 represents both the center region and the mean-level value of the values of image signal components representing the picture elements, which are located in the center region. Also, Qij, where i=1, 2, ..., 8 and J=1, 2, 3, represents both the peripheral regions and the mean-level values representing the mean level of the values of the image signal components representing the picture elements, which are located in each of the peripheral regions.

Thereafter, differences $\Delta ij$, where i=1, 2, ..., 8 and J=1, 2, 3, between the mean-level value Q0 corresponding to the center region and the respective mean-level values Qij corresponding to the peripheral regions are calculated from the formula $$\Delta ij = Qij - Q0 \quad (15)$$

For each of the lines Li, the maximum value $\Delta i$ of the differences $\Delta ij$ is then found. Specifically, as for the line L1, a maximum value $\Delta 1$ is found from $\Delta 11$, $\Delta 12$, and $\Delta 13$. As for the line L5, a maximum value $\Delta 5$ is found from $\Delta 51$, $\Delta 52$, and $\Delta 53$.

A first characteristic value U is then found, which is representative of the maximum values $\Delta i$, where i=1, 2, ..., 8, which have been found for the plurality of the lines Li. Also, a second characteristic value V is found, which represents the amount of dispersion in the maximum values $\Delta i$, where i=1, 2, ..., 8. For this purpose, first, characteristic values U1, U2, U3, and U4, and characteristic values V1, V2, V3, and V4 are calculated from the formulas $$U1 = (\Delta 1 + \Delta 2 + \Delta 5 + \Delta 6)/4 \quad (16)$$
$$U2 = (\Delta 2 + \Delta 3 + \Delta 6 + \Delta 7)/4 \quad (17)$$
$$U3 = (\Delta 3 + \Delta 4 + \Delta 7 + \Delta 8)/4 \quad (18)$$
$$U4 = (\Delta 4 + \Delta 5 + \Delta 8 + \Delta 1)/4 \quad (19)$$
$$V1 = U1/U3 \quad (20)$$
$$V2 = U2/U4 \quad (21)$$
$$V3 = U3/U1 \quad (22)$$
$$V4 = U4/U2 \quad (23)$$

By way of example, the process for calculating the characteristic value U1 from Formula (16) has the effects described below. Specifically, the addition of the maximum values corresponding to two adjacent groups of peripheral regions, which are located on the same side with respect to the predetermined picture element P0, (i.e. the addition of $\Delta 1$ and $\Delta 2$, or the addition of $\Delta 5$ and $\Delta 6$) corresponds to a smoothing process. Also, the maximum values corresponding to peripheral regions, which are located on opposite sides with respect to the predetermined picture element P0, are added together (in the case of Formula (16), the sum of $\Delta 1$ and $\Delta 2$ and the sum of $\Delta 5$ and $\Delta 6$ are added together). Such an addition is carried out in order that a tumor pattern can be detected even when, as shown in FIG. 6, the distribution of the values of the image signal components representing the tumor pattern is asymmetric.

As for the calculation of the characteristic value V1 from Formula (20), the characteristic values U1 and U3 represent characteristics of the image in directions which are perpendicular to each other. Therefore, in cases where the shape of the tumor pattern is circular in FIG. 6, V1 will be approximately equal to 1.0. In cases where the predetermined picture element P0 is present in a linear pattern, such as a rib pattern, V1 will not be equal to 1.0.

As the first characteristic value U, which is representative of the maximum values $\Delta i$, where $i = 1, 2, \ldots, 8$, of the aforesaid differences, the maximum value of the characteristic values U1, U2, U3, and U4, i.e.

$$U = MAX (U1, U2, U3, U4) \quad (24)$$

is employed. Also, as the second characteristic value V, which represents the amount of dispersion in the maximum values $\Delta i$, where $i = 1, 2, \ldots, 8$, of the aforesaid differences, the maximum value of the characteristic values V1, V2, V3, and V4 i.e.

$$V = MAX (V1, V2, V3, V4) \quad (25)$$

is employed. After the first characteristic value U and the second characteristic value V have been found in the manner described above, a characteristic value C3 is calculated and then used during the judgment as to whether a predetermined picture element P0 falls or does not fall within the region corresponding to the tumor pattern. As the characteristic value C3, the ratio of the first characteristic value U to the second characteristic value V is employed, which is expressed as $$C3 = \frac{U}{V} \quad (26)$$

The characteristic value C3 is then compared with a predetermined threshold value Th3. From whether $C3 \geq Th3$ or $C3 < Th3$, the judgment is made as to whether the predetermined picture element P0 falls or does not fall within the region corresponding to the tumor pattern.

In the examples of the filters described above, eight imaginary lines, L1 through L8, are drawn around a predetermined picture element P0 in an X-ray image. However, the number of lines Li is not limited to eight, but may, for example, be 16. Also, the distances from the predetermined picture element P0 are not limited to the three distances (r1, r2, and r3). For example, in cases where the sizes of the tumor patterns, which are to be detected, are approximately the same, only a single distance need be employed. Also, in order for tumor patterns having various sizes to be detected more accurately, operations may be carried out for a plurality of distances whose lengths vary approximately continuously between the length of the distance r1 and the length of the distance r3.

Also, the prospective abnormal pattern finding means 2 may employ any of other filters. Additionally, different filters may be employed for the original image, the soft tissue image, and the bone image.

Bone Pattern Finding Means

As described above, the bone image signal S2, which has been generated by the image operating means 1 and which represents the bone image shown in FIG. 4B, is also fed into the bone pattern finding means 3.

From the received bone image signal S2, the bone pattern finding means 3 finds the information about the positions of the bone patterns in the bone image.

As an aid in explaining how the information about the positions of the bone patterns in the bone image is found, FIG. 9A shows part of the bone image shown in FIG. 4B, and FIG. 9B shows the bone image signal S2 which corresponds to the part of the bone image shown in FIG. 9A.

The part of the bone image shown in FIG. 9A includes two rib patterns 56, 56. The two rib patterns 56, 56 overlap one upon the other at part 56a. The graph of FIG. 9B shows the levels of the image signal components of the bone image signal S2 representing the picture elements arrayed along the y axis in FIG. 9A. Because the bone image is composed only of the bone patterns, the regions corresponding to the bone patterns and the other region can be clearly discriminated from each other. Therefore, by investigating whether the levels of the image signal components of the bone image signal S2 are or are not lower than a threshold value Th4, it can be found whether a certain region corresponds or does not correspond to the bone patterns. In this manner, the information about the positions of the bone patterns can be obtained. The part 56a, at which the rib patterns 56, 56 overlap one upon the other, can be detected by, for example, approximately representing the rib patterns 56, 56 with curves of secondary order and finding a region at which the approximate curves intersect with each other.

Instead of the processing with the threshold value being employed, the information about the positions of the bone patterns may be found by, for example, carrying out differentiation processing on the image signal components of the bone image signal S2 and detecting the positions, which correspond to peaks of the values resulting from the differentiation processing. Also, the bone image signal S2 need not necessarily be used during the detection of the information about the positions of the bone patterns. By way of example, the original image signal may be used during the detection of the information about the positions of the bone patterns. For this purpose, a method may be employed which is described in "Discrimination of Rib Patterns in X-ray Fluorographic Image of the Chest", The Institute of Electronics and Communication Engineers of Japan, Oct. 26, 1972, material No. IT72-24 (1972-10) of the society for the study of image engineering. With the method, a linear figure is extracted by processing an image signal representing an X-ray image of the chest with a filter, which is sensitive to lines. From the position of the linear figure in the X-ray image, the direction along which the linear figure extends, or the like, lines corresponding to a rib pattern are detected. Thereafter, boundary lines of the rib pattern are approximately represented by a function of second order. In this manner, a rib pattern is extracted.

Judgment Means

In the manner described above, information J1, J2, and J3 about the positions of the prospective tumor patterns in the soft tissue image, the bone image, and the original image are generated by the prospective abnormal pattern finding means 2. The information J1, J2, and J3 are fed from the prospective abnormal pattern finding means 2 into the judgment means 4 of the computer system 40. Also, the information B about the positions of the bone patterns in the radiation image, is fed from the bone pattern finding means 3 into the judgment means 4.

In this embodiment, the judgment means 4 employs the judgment criteria described below and judges whether the prospective tumor patterns, which have been found by the prospective abnormal pattern finding means 2, are or are not true tumor patterns. As an aid in facilitating the explanation, the prospective tumor patterns corresponding to the information J1, J2, and J3 will hereinbelow be also denoted by J1, J2, and J3.

First, the original image includes both the soft tissue patterns and the bone patterns. Therefore, in cases where a certain prospective tumor pattern is found in the soft tissue image or the bone image but no prospective tumor pattern is found at the corresponding position in the original image, it is judged that this prospective tumor pattern is not a true tumor pattern.

In cases where a prospective tumor pattern J3 is found in the original image, judgments are made in the manner described below.

i) In cases where a prospective tumor pattern J1 is found at a position in the soft tissue image, which position corresponds to the position of the prospective tumor pattern J3, no prospective tumor pattern is found at the corresponding position in the bone image, and the position of the prospective tumor pattern J1 does not correspond to the intersection of the rib patterns shown in FIG. 9A, the prospective tumor pattern is kept uneliminated. Only when the prospective tumor pattern is judged as being a tumor pattern during the operations for discriminating a tumor pattern and blood vessel patterns from each other, which will be described later, it is judged that the prospective tumor pattern is a true tumor pattern.

ii) In cases where a prospective tumor pattern J1 is found at a position in the soft tissue image, which position corresponds to the position of the prospective tumor pattern J3, and the position of the prospective tumor pattern J1 corresponds to the intersection of the rib patterns, it is judged that the prospective tumor pattern is a true tumor pattern, which is present at the intersection of the rib patterns.

iii) In cases where a prospective tumor pattern J2 is found at a position in the bone image, which position corresponds to the position of the prospective tumor pattern J3, the position of the prospective tumor pattern J2 does not correspond to the intersection of the rib patterns, and no prospective tumor pattern is found at the corresponding position in the soft tissue image, it is judged that the prospective tumor pattern will correspond to a calcified region, e.g. a trace of a tubercle.

iv) In cases where a prospective tumor pattern J2 is found at a position in the bone image, which position corresponds to the position of the prospective tumor pattern J3, the position of the prospective tumor pattern J2 corresponds to the intersection of the rib patterns, and no prospective tumor pattern is found at the corresponding position in the soft tissue image, it is judged that the intersection of the rib patterns was found as the prospective tumor pattern by mistake, and that the prospective tumor pattern is not a true tumor pattern.

v) In cases where no prospective tumor pattern is found at the corresponding positions in the soft tissue image and the bone image, and the position of the prospective tumor pattern J3 corresponds to the position of a rib pattern, it is judged that the rib pattern was found as the prospective tumor pattern by mistake, and that the prospective tumor pattern is not a true tumor pattern.

vi) In cases where no prospective tumor pattern is found at the corresponding positions in the soft tissue image and the bone image, and the position of the prospective tumor pattern J3 corresponds to the region other than the rib patterns, it is judged that, because the image quality of the soft tissue image is worse (i.e. the S/N ratio is lower) than the original image, the corresponding prospective tumor pattern was not found in the soft tissue image, and that the prospective tumor pattern J3 is a true tumor pattern.

An example of the algorithms employed during the operations for discriminating a tumor pattern and blood vessel patterns from each other as described in (i) will be described hereinbelow. Such algorithms are proposed in U.S. Pat. application Ser. No. 543,530.

Figure 10A:
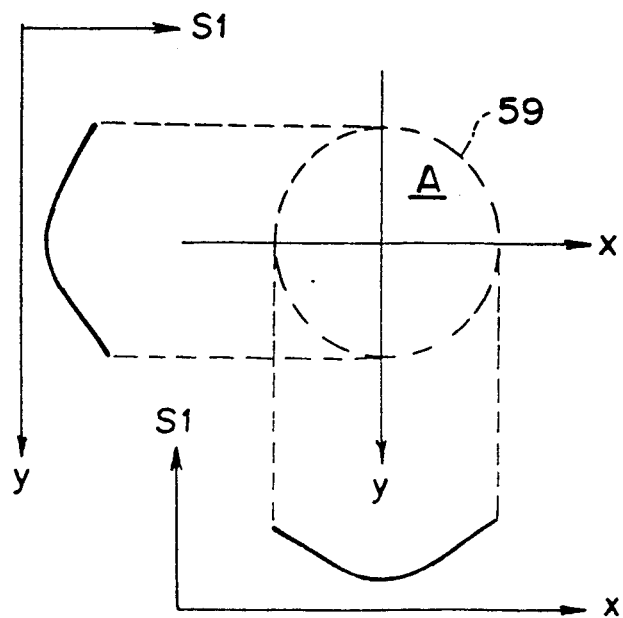
FIG. 10A is a diagram showing a region found as a prospective tumor pattern, which region corresponds to a true tumor pattern, and profiles of the X-ray image in the region along the x and y directions.
Figure 10B:
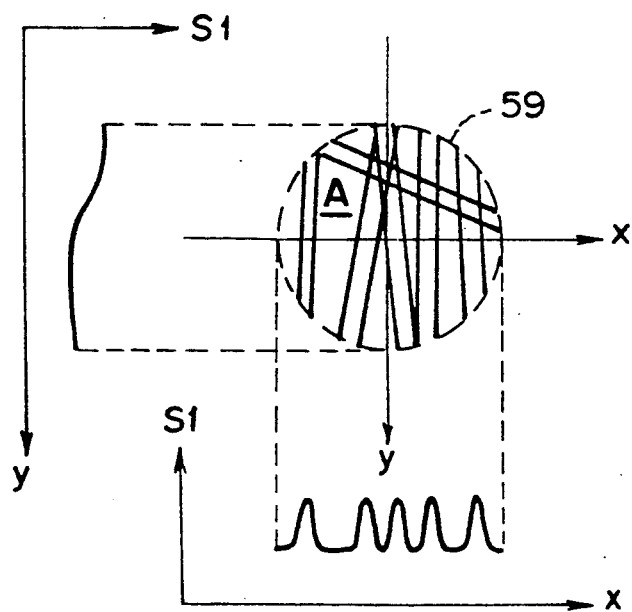
FIG. 10B is a diagram showing a region found as a prospective tumor pattern, which region is composed of many linear patterns, such as blood vessel patterns, and profiles of the X-ray image in the region along the x and y directions.

FIG. 10A is a diagram showing a region found as a prospective tumor pattern, which region corresponds to a true tumor pattern, and profiles of the soft tissue image in the region along the x and y directions. FIG. 10B is a diagram showing a region found as a prospective tumor pattern, which region is composed of many linear patterns, such as blood vessel patterns, and profiles of the soft tissue image in the region along the x and y directions. In each of FIGS. 10A and 10B, the region surrounded by the broken line 59, i.e. the region A, is the one which has been found as a prospective tumor pattern. The graphs show the profiles of the soft tissue image (i.e. the distributions of the values of the soft tissue image signal S1) in the region A along the x and y directions.

As shown in FIG. 10A, a true tumor pattern has concave, comparatively flat profiles in the x and y directions. On the other hand, as shown in FIG. 10B, in a region composed of many linear patterns, the image profile in one direction (x direction in FIG. 10B) changes at short intervals, and the image profile in the other direction (y direction in FIG. 10B) is comparatively flat. Therefore, the difference in image profile is utilized during the elimination of regions, which are composed of many linear patterns, from the prospective tumor patterns. Specifically, a mean value is calculated from the square values of first-order differences between the values of image signal components representing adjacent picture elements, which are located along each of the x and y directions in the region A. The calculations are carried out with the formulas $$Z_x = \sum_{m}\sum_{n}_{(m,n)\ A} \{f(m+1,n) - f(m,n)\}^2/N \tag{27}$$

$$Z_y = \sum_{m}\sum_{n}_{(m,n)\ A} \{f(m,n+1) - f(m,n)\}^2/N \tag{28}$$

In Formulas (27) and (28), m, where m=1, 2, . . . , denotes picture elements located along the x direction, and n, where n=1, 2, . . . , denotes picture elements located along the y direction. Also, f(m,n) denotes the values of image signal components representing the picture elements (m,n) Further, $$\sum_m \sum_n_{(m,n)\ A}$$

denotes the addition of the square values of first-order differences in the region A, and N denotes the number of picture elements in the region A.

Thereafter, a calculation is made to find a characteristic value C4 which is used during the judgment as to whether a region is or is not to be detected as a true tumor pattern. The calculation is carried out with the formula $$C4 = \frac{\min (Zx, Zy)}{\max (Zx, Zy)} \quad (29)$$

where min(Zx,Zy) denotes the mean value Zx or the mean value Zy, whichever is smaller, and max(Zx,Zy) denotes the mean value Zx or the mean value Zy, whichever is larger. The characteristic value C4 is then compared with a predetermined threshold value Th5. When C4≧Th5, the region is detected as a true tumor pattern. When C4<Th4, the region is not detected as a true tumor pattern.

The characteristic value C4 need not necessarily be calculated with Formula (29), but may be calculated with, for example, one of the formulas $$C4 = \frac{|Zx - Zy|}{Zx + Zy} \quad (30)$$

$$C4 = |Zx - Zy| \quad (31)$$

Also, in the example described above, calculations are carried out to find the first-order differences f(m+1,n)−f(m,n), f(m,n+1)−f(m,n) between the values of image signal components representing adjacent picture elements, which are located along each of the x and y directions in the region A. Alternatively, calculations may be made to find differences between the values of image signal components representing adjacent picture elements, which are located in the region A along oblique directions, which are not perpendicular to the x direction nor to the y direction.

In the manner described above, the judgment means 4 of the computer system 40 shown in FIG. 3 judges whether the prospective tumor patterns, which have been found by the prospective abnormal pattern finding means 2, are or are not true tumor patterns.

An embodiment of the second abnormal pattern detecting apparatus in accordance with the present invention will be described below. In this embodiment, X-ray images are stored on stimulable phosphor sheets, and a pattern of a tumor, which typically has an approximately spherical shape in the lungs of a human body, is detected as an abnormal pattern from the X-ray images. In a visible image reproduced from an image signal representing the X-ray image, the tumor pattern typically appears as an approximately circular pattern having a lower density than the areas of the image surrounding the tumor pattern.

First, in the X-ray image recording apparatus of FIG. 2, the first and second X-ray images are stored on the first stimulable phosphor sheet 5 and the second stimulable phosphor sheet 6 in the same manner as that described above. Thereafter, in the X-ray image read-out apparatus, the first and second X-ray images are read out from the first stimulable phosphor sheet 5 and the second stimulable phosphor sheet 6 in the same manner as that described above. The first image signal SO1 and the second image signal SO2, which are generated by the A/D converter 33 shown in FIG. 3 and which represent the first and second X-ray images, are fed into the computer system 40 shown in FIG. 3. In this embodiment, the computer system 40 is provided with an embodiment of the second abnormal pattern detecting apparatus in accordance with the present invention.

From the first image signal SO1 and the second image signal SO2 which have been fed into the computer system 40, an abnormal pattern in the X-ray image is detected. The computer system 40 carries out the operations corresponding to the blocks 71 through 74 shown in FIG. 11. The blocks 71 through 74 shown in FIG. 11 will hereinafter be referred to as the blocks representing the functions of the computer system 40.

The image signals SO1 and SO2, which are digital electric signals representing the first and second X-ray images, are fed into the image operating means 71 of the computer system 40, which image operating means 71 is shown in FIG. 11.

Image Operating Means

From the first image signal SO1 and the second image signal SO2, the image operating means 71 of the computer system 40 adjusts the positions of the first and second X-ray images in the same manner as that described above for the image operating means 1 shown in FIG. 1. After a first image signal SO1' and a second image signal SO2' are obtained, which respectively represent the first and second X-ray images whose positions have been adjusted, the image operating means 71 subtracts the image signal components of the first image signal SO1' and the second image signal SO2' from each other which represent corresponding picture elements in the two X-ray images. The subtraction processing is carried out with Formula (9). In this manner, a bone image signal S2 is obtained which represents a bone image.

Each of the first and second X-ray images is composed of the patterns of the soft tissues and bones, though the image densities (the values of the image signal) of the patterns of the soft tissues and bones are different for the first and second X-ray images. Therefore, either one of the first and second X-ray images may be employed as the original image. However, in this embodiment, in order that noise occurring in the X-ray image due to, for example, sway of the X-rays during the image recording operation may be reduced, superposition processing is carried out with Formula (10). The image signal S3 obtained from the superposition processing is employed as the original image signal S3 representing the original image, which is composed of both the soft tissue patterns and the bone patterns. In this embodiment, the image operating means 71 finds the bone image and the original image from the image signals SO1 and SO2 representing the two X-ray images. Alternatively, the image operating means 71 may find the bone image and the original image from a plurality of the image signals S01, S02, ..., S0n. (Such a technique is disclosed in U.S. Pat. No. 4,855,598.)

As illustrated in FIG. 4B, in the bone image, the soft tissue patterns have been eliminated from the X-ray image of the object, and only the patterns of the bones are formed. Also, as illustrated in FIG. 4C, in the original image, both the soft tissue patterns and the bone patterns are formed.

Of the image signals S2 and S3 generated by the image operating means 71 of the computer system 40, the original image signal S3 is fed into the prospective abnormal pattern finding means 72 of the computer system 40. Also, the bone image signal S2 is fed into the bone pattern finding means 73 of the computer system 40.

When necessary, the image operating means 71 carries out other image processing, such as frequency response enhancement processing, smoothing processing, or noise elimination processing on the first image signal S01 and the second image signal S02, or on the bone image signal S2 and the original image signal S3.

Prospective Abnormal Pattern Finding Means

The prospective abnormal pattern finding means 72, which is provided in the computer system 40, finds tumor patterns, which appear in the original image. For this purpose, the prospective abnormal pattern finding means 72 processes the original image signal S3, which have been received from the image operating means 71, with a tumor pattern finding filter in the same manner as that described above for the prospective abnormal pattern finding means 2 shown in FIG. 1.

Bone Pattern Finding Means

The bone image signal S2, which has been generated by the image operating means 71 and which represents the bone image shown in FIG. 4B, is fed into the bone pattern finding means 73.

From the received bone image signal S2, the bone pattern finding means 73 finds the information about the positions of the bone patterns in the bone image in the same manner as that described above for the bone pattern finding means 3 shown in FIG. 1.

Judgment Means

In the manner described above, information J about the positions of the prospective tumor patterns in the original image is generated by the prospective abnormal pattern finding means 72. The information J is fed from the prospective abnormal pattern finding means 72 into the judgment means 74 of the computer system 40. Also, the information B about the positions of the bone patterns in the bone image, is fed from the bone pattern finding means 73 into the judgment means 74.

The judgment means 74 judges whether the positions of the prospective tumor patterns in the image and the positions of the bone patterns coincide or do not coincide with each other. In cases where the position of a prospective tumor pattern coincides with the positions of the bone patterns, it is judged that the intersection of rib patterns in the image, or the like, was found by mistake as the prospective tumor pattern, and that the prospective tumor pattern is therefore not a true tumor pattern. In cases where the position of the prospective tumor pattern corresponds to the region other than the bone patterns, the prospective tumor pattern is kept uneliminated. This is because, in this embodiment, in order for accurate judgments to be made, tumor patterns and blood vessel patterns are then optionally discriminated from each other in the manner described above with reference to FIGS. 10A and 10B, such that blood vessel patterns are not detected as tumor patterns. In such cases, the same operations as those described above with respect to Formulas (27) through (31) are carried out on the original image signal S3.

In the manner described above, the judgment means 74 of the computer system 40 shown in FIG. 3 judges whether the prospective tumor patterns, which have been found by the prospective abnormal pattern finding means 72, are or are not true tumor patterns.

In the aforesaid embodiments of the first and second abnormal pattern detecting apparatuses in accordance with the present invention, from X-ray images of the chest of a human body, which images have been stored on stimulable phosphor sheets, tumor patterns are detected which appear, typically, as circular patterns on the X-ray images. However, the first and second abnormal pattern detecting apparatuses in accordance with the present invention are not limited to the detection of circular tumor patterns nor to the processing of X-ray images of chests. Also, recording media other than stimulable phosphor sheets may be used. The first and second abnormal pattern detecting apparatuses in accordance with the present invention are applicable widely when, from image signals representing radiation images of an object, abnormal patterns in the radiation images are detected.

We claim:

1. An abnormal pattern detecting apparatus wherein, from an image signal representing a radiation image of an object which is constituted of soft tissues and bones, an abnormal pattern in the radiation image is detected, the abnormal pattern detecting apparatus comprising:
  i) an image operating means for generating:
    a) a soft tissue image signal, which represents a soft tissue image primarily composed of patterns of the soft tissues of said object,
    b) a bone image signal, which represents a bone image primarily composed of patterns of the bones of said object, and
    c) an original image signal, which represents an original image composed of both the patterns of the soft tissues and the patterns of the bones of said object,
  said soft tissue image signal, said bone image signal, and said original image signal being generated from a plurality of image signals representing a plurality of radiation images of said object, which radiation images have been recorded by exposing said object to at least two kinds of radiation having different energy distributions,
  ii) a prospective abnormal pattern finding means for finding prospective abnormal patterns, which appear in each of said soft tissue image, said bone image, and said original image, by processing each of said soft tissue image signal, said bone image signal, and said original image signal with an abnormal pattern finding filter,
  iii) a bone pattern finding means for finding information about the positions of bone patterns, which appear in the radiation image, and
  iv) a judgment means for making judgments as to whether the prospective abnormal patterns, which have been found in each of said soft tissue image, said bone image, and said original image by said prospective abnormal pattern finding means, are or are not true abnormal patterns, the judgments being made from information about the positions of the prospective abnormal patterns, and from the information about the positions of the bone patterns which has been found by said bone pattern finding means.

2. An apparatus as defined in claim 1 wherein said image operating means carries out superposition processing on the plurality of said image signals representing the plurality of said radiation images of said object and utilizes an image signal, which is obtained from the superposition processing, as said original image signal.

3. An apparatus as defined in claim 1 wherein said abnormal pattern finding filter is a spatial-domain filter.

4. An apparatus as defined in claim 1 wherein said bone pattern finding means finds the information about the positions of bone patterns, which appear in the radiation image, from said bone image signal.

5. An apparatus as defined in claim 1 wherein each of said radiation images of said object has been stored on a stimulable phosphor sheet.

6. An apparatus as defined in claim 5 wherein the image signal representing each of said radiation images is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

7. An apparatus as defined in claim 6 wherein said stimulating rays are a laser beam.

8. An apparatus as defined in claim 1 wherein each of said radiation images of said object has been recorded on photographic film.

9. An abnormal pattern detecting apparatus wherein, from an image signal representing a radiation image of an object which is constituted of soft tissues and bones, an abnormal pattern in the radiation image is detected, the abnormal pattern detecting apparatus comprising:
  i) an image operating means for generating:
    a) a bone image signal, which represents a bone image primarily composed of patterns of the bones of said object, and
    b) an original image signal, which represents an original image composed of both the patterns of the soft tissues and the patterns of the bones of said object,
  said bone image signal and said original image signal being generated from a plurality of image signals representing a plurality of radiation images of said object, which radiation images have been recorded by exposing said object to at least two kinds of radiation having different energy distributions,
  ii) a prospective abnormal pattern finding means for finding prospective abnormal patterns, which appear in said original image, by processing said original image signal with an abnormal pattern finding filter,
  iii) a bone pattern finding means for finding information about the positions of bone patterns, which appear in the radiation image, from said bone image signal, and
  iv) a judgment means for making judgments as to whether the prospective abnormal patterns, which have been found by said prospective abnormal pattern finding means, are or are not true abnormal patterns, the judgments being made from information about the positions of the prospective abnormal patterns, and from the information about the positions of the bone patterns which has been found by said bone pattern finding means.

10. An apparatus as defined in claim 9 wherein said image operating means carries out superposition processing on the plurality of said image signals representing the plurality of said radiation images of said object and utilizes an image signal, which is obtained from the superposition processing, as said original image signal.

11. An apparatus as defined in claim 9 wherein said abnormal pattern finding filter is a spatial-domain filter.

12. An apparatus as defined in claim 9 wherein each of said radiation images of said object has been stored on a stimulable phosphor sheet.

13. An apparatus as defined in claim 12 wherein the image signal representing each of said radiation images is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

14. An apparatus as defined in claim 13 wherein said stimulating rays are a laser beam.

15. An apparatus as defined in claim 9 wherein each of said radiation images of said object has been recorded on photographic film.

* * * * *